(12) United States Patent
Wu

(10) Patent No.: US 6,463,946 B1
(45) Date of Patent: Oct. 15, 2002

(54) TABLE ROTATING DEVICE

(75) Inventor: Ming-Che Wu, Chiayi Hsien (TW)

(73) Assignee: Global Plastic Industries Co., Ltd., Chiayi Hsien (TW)

( * ) Notice: Subject to any disclaimer, the term of this patent is extended or adjusted under 35 U.S.C. 154(b) by 0 days.

(21) Appl. No.: 09/590,716

(22) Filed: Jun. 8, 2000

(51) Int. Cl.[7] .............................................. A45B 5/00
(52) U.S. Cl. ........................... 135/16; 135/99; 108/94; 108/50.12; 248/349.1; 211/163
(58) Field of Search .............................. 135/99, 98, 16, 135/910; 248/186.2, 349.1; 108/139, 151, 103, 104

(56) References Cited

U.S. PATENT DOCUMENTS

| | | | | |
|---|---|---|---|---|
| 1,396,246 A | * | 11/1921 | Bouvier ...................... 108/139 |
| 3,455,531 A | * | 7/1969 | Baker .......................... 248/349 |
| 3,653,340 A | * | 4/1972 | Bugg .......................... 108/139 |
| 4,003,320 A | * | 1/1977 | Owens et al. ............... 108/157 |
| 4,114,952 A | * | 9/1978 | Kimmell ...................... 301/5.7 |
| 4,328,942 A | * | 5/1982 | Birnbaum .................... 248/558 |
| 4,584,946 A | * | 4/1986 | Tucker et al. ................. 108/50 |
| 4,687,198 A | * | 8/1987 | Smith .......................... 272/114 |
| 4,694,132 A | * | 9/1987 | Liu ....................... 219/10.55 F |
| 4,708,256 A | * | 11/1987 | Intardonato ................. 220/23.4 |
| 4,776,046 A | * | 10/1988 | Newberry et al. .............. 4/541 |
| 4,919,383 A | * | 4/1990 | Benjamin et al. ........... 248/349 |
| 5,080,322 A | * | 1/1992 | Harley ........................ 248/349 |
| 5,110,098 A | * | 5/1992 | Merjanian .................... 269/21 |
| 5,322,023 A | * | 6/1994 | Hammond ................... 108/50 |
| 5,335,803 A | * | 8/1994 | O'Brien et al. ............. 211/163 |
| 5,479,867 A | * | 1/1996 | Belvins et al. ................ 108/94 |
| 5,493,976 A | * | 2/1996 | Hammond ................... 108/50 |
| 5,564,669 A | * | 10/1996 | Wu ........................ 248/346.01 |
| 5,848,712 A | * | 12/1998 | Weir .......................... 211/107 |
| 6,082,269 A | * | 7/2000 | Padberg ....................... 108/44 |
| 6,299,454 B1 | * | 10/2001 | Henderson et al. ........... 439/19 |

* cited by examiner

Primary Examiner—Blair M. Johnson
Assistant Examiner—Khoa Tran
(74) Attorney, Agent, or Firm—Alan Kamrath; Rider, Bennett, Egan & Arundel, LLP

(57) ABSTRACT

A rotating device has a turning wheel, a threaded sleeve, and a nut. The turning wheel has a hub having a center hole, a wheel rim, and a plurality of spokes connected to the hub and the wheel rim. The threaded sleeve has a flange and an outer thread. The threaded sleeve is inserted through the center hole of the hub and a through hole of a table plate. The nut engages with the outer thread of the threaded sleeve. An umbrella has a center post inserted through the threaded sleeve.

10 Claims, 5 Drawing Sheets

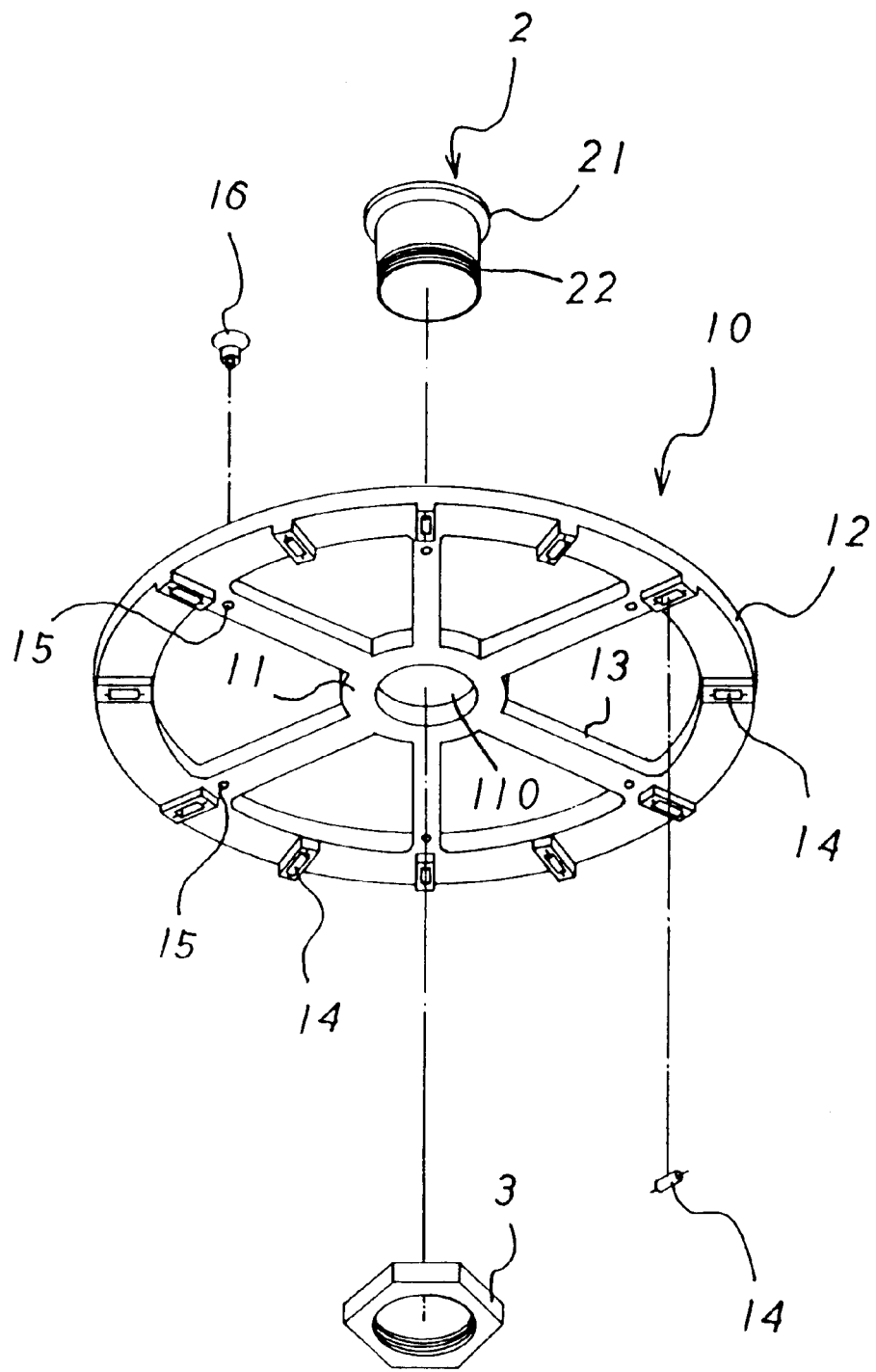
F I G. 1

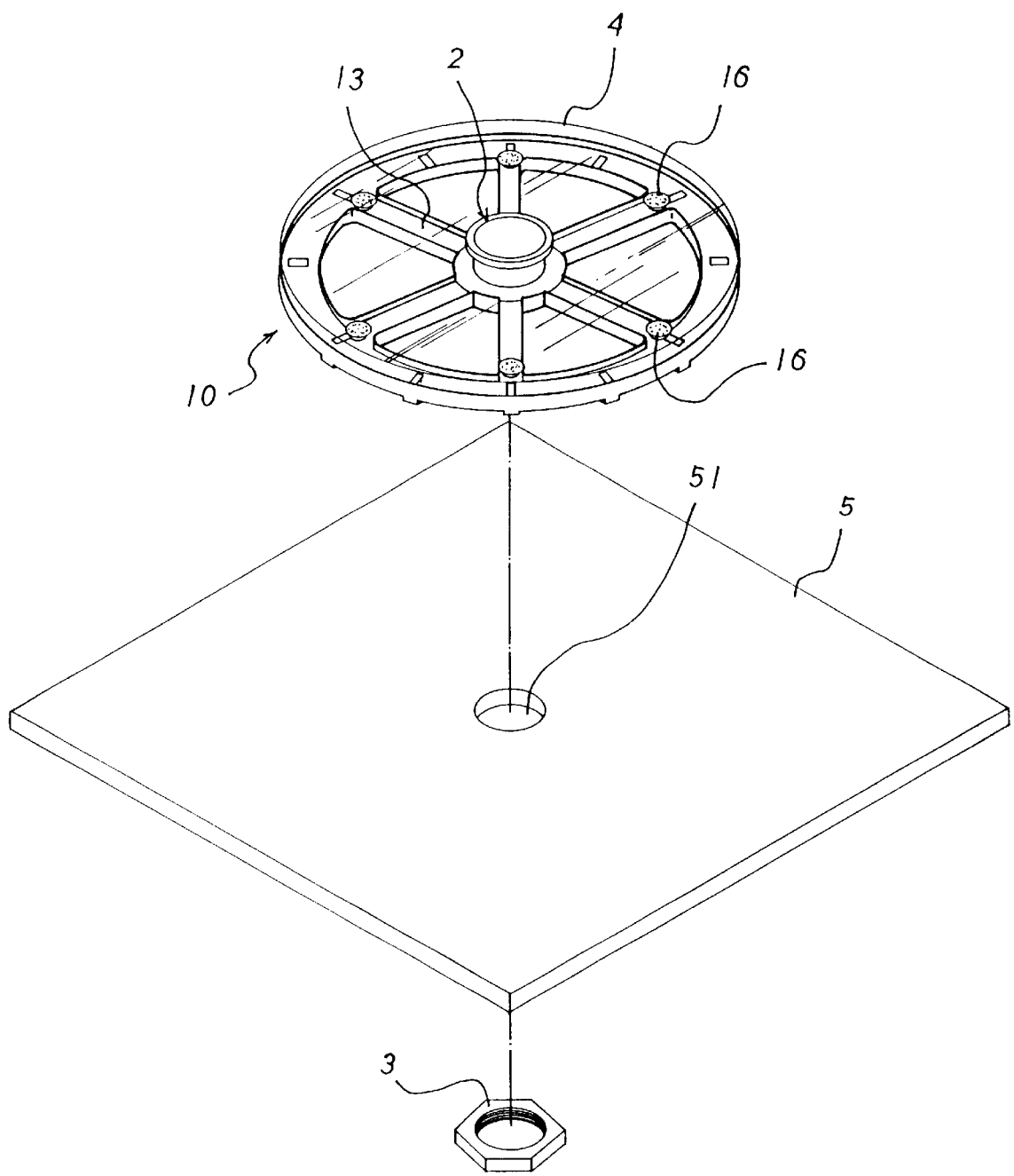
F I G. 2

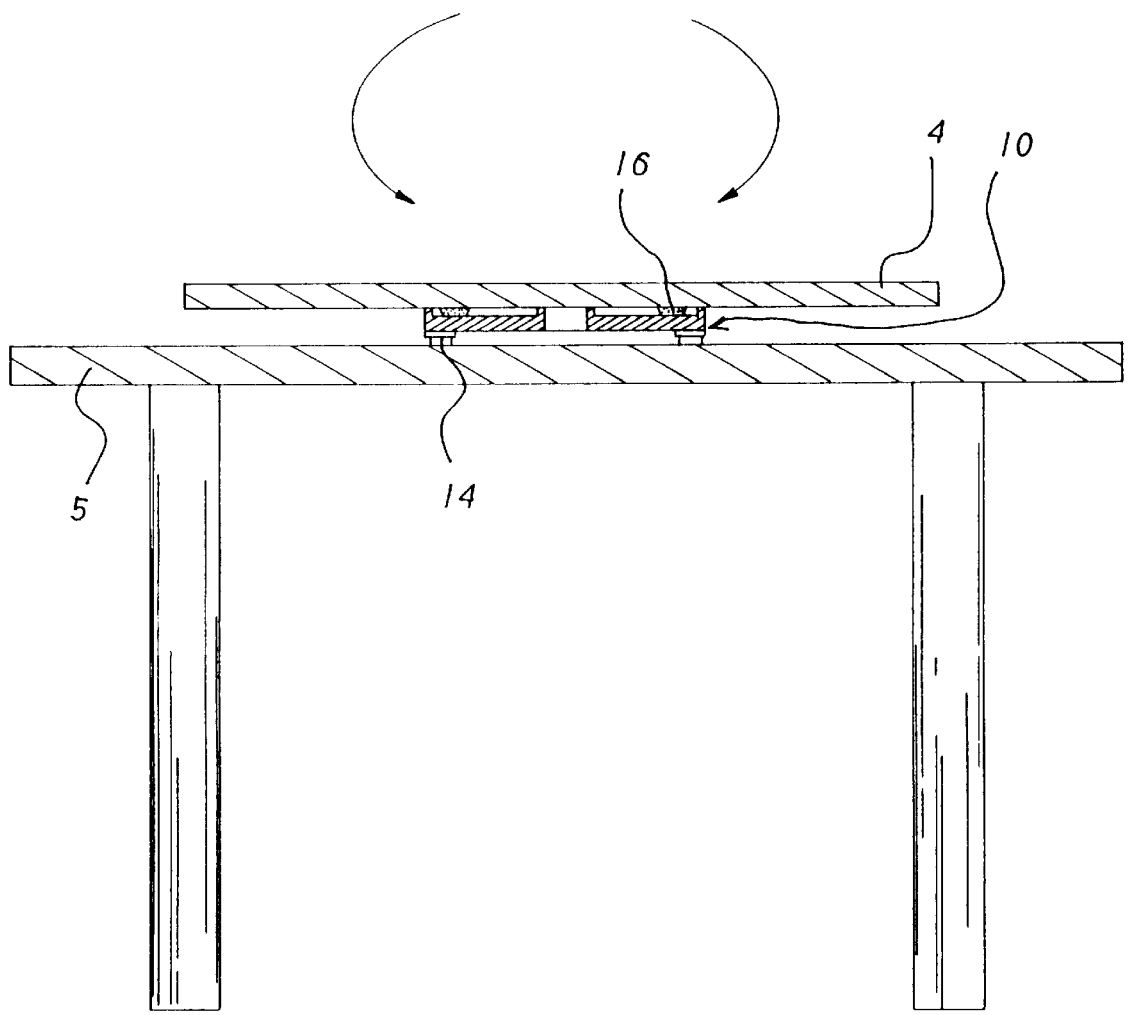
F I G. 4

TABLE ROTATING DEVICE

BACKGROUND OF THE INVENTION

The present invention relates to a rotating device. More particularly, the present invention relates to a rotating device which is disposed on a table.

A conventional table has a center hole for receiving an umbrella stand in order to screen sunlight. A conventional rotating device is disposed on the conventional table. However, the conventional rotating device will be displaced from the conventional table. The conventional table will be damaged after a long period of usage.

SUMMARY OF THE INVENTION

An object of the present invention is to provide a rotating device which has a plurality of suction cups to position a rotating device on a table.

Another object of the present invention is to provide an outer threaded sleeve to position a rotating device on a table.

Another object of the present invention is to provide an outer threaded sleeve to prevent a table from contacting an umbrella stand.

Accordingly, a rotating device comprises a turning wheel, a threaded sleeve, and a nut. The turning wheel has a hub having a center hole, a wheel rim, and a plurality of spokes connected to the hub and the wheel rim. The threaded sleeve has a flange and an outer thread. The threaded sleeve is inserted through the center hole of the hub and a through hole of a table plate. The nut engages with the outer thread of the threaded sleeve. An umbrella has a center post inserted through the threaded sleeve.

BRIEF DESCRIPTION OF THE DRAWINGS

FIG. 1 is a perspective exploded view of a rotating device of a preferred embodiment in accordance with the present invention;

FIG. 2 is a perspective assembly view of a rotating device of a preferred embodiment in accordance with the present invention;

FIG. 4 is a schematic view illustrating a second application of a rotating device of a preferred embodiment in accordance with the present invention.

DETAILED DESCRIPTION OF THE INVENTION

Figure 3:
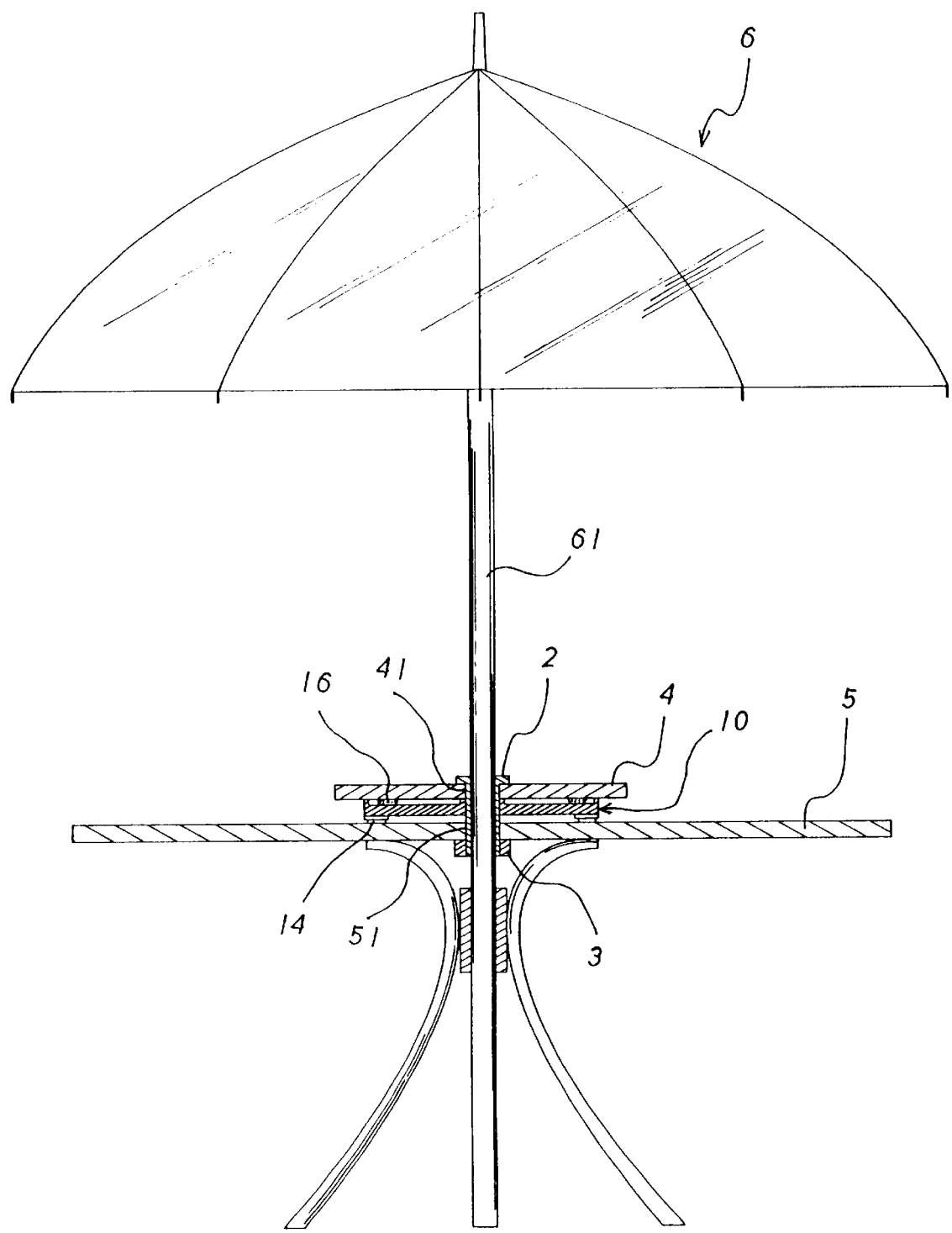
FIG. 3 is a schematic view illustrating a first application of a rotating device of a preferred embodiment in accordance with the present invention.

Referring to FIGS. 1 to 5, a rotating device is disposed on a table 5. The rotating device comprises a turning wheel 10, a threaded sleeve 2, and a nut 3.

The turning wheel 10 has a hub 11 having a center hole 110, a wheel rim 12, and a plurality of spokes 13 connected to the hub 11 and the wheel rim 12.

A plurality of bottom protruded bars 14 are disposed on a bottom of the turning wheel 10.

The threaded sleeve 2 has a flange 21 and an outer thread 22.

The threaded sleeve 2 is inserted through the center hole 110 of the hub 11 and a through hole 51 of a plate of the table 5.

The nut 3 engages with the outer thread 22 of the threaded sleeve 2.

An umbrella 6 has a center post 61 inserted through the threaded sleeve 2.

Each of the spokes 13 has an aperture 15.

At least a suction cup 16 is inserted through the aperture 15 of the spoke 13.

An upper cover 4 covers the turning wheel 10. The upper cover 4 has a round hole 41 and a lower flange 42.

Referring to FIG. 4, the rotating device is disposed on a dining table 5.

Figure 5:
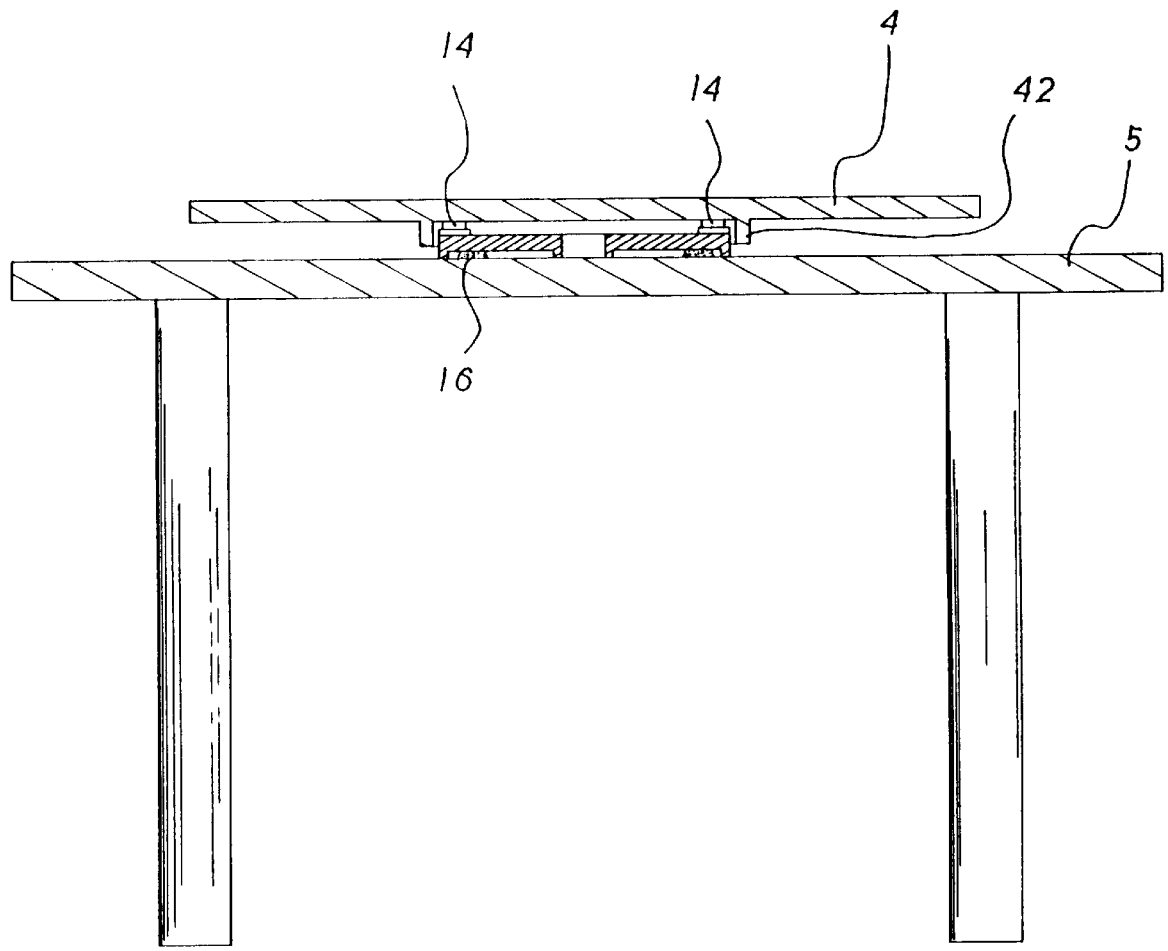
FIG. 5 is a schematic view illustrating a third application of a rotating device of a preferred embodiment in accordance with the present invention.

Referring to FIG. 5, the rotating device is disposed on a large table 5.

The present invention is not limited to the above embodiments but various modifications thereof may be made. Furthermore, various changes in form and detail may be made without departing from the scope of the present invention.

I claim:

1. A rotating device for a table plate comprising:

a turning wheel, a threaded sleeve, and a nut, with the turning wheel having a top and a bottom, with the turning wheel including a hub having a center hole extending between the top and the bottom, a wheel rim, and a plurality of spokes connected to the hub and the wheel rim, with the plurality of spokes having a plurality of apertures, with the threaded sleeve having a flange and an outer thread, with the threaded sleeve inserted through the center hole of the hub and adapted to be inserted through a through hole of the table plate, with the nut engaging with the outer thread of the threaded sleeve, and a plurality of suction cups, with each suction cup inserted through said aperture of said spoke and located above the top of the turning wheel.

2. The rotating device as claimed in claim 1, further comprising an upper cover disposed on the top of the turning wheel and extending over the spokes and the wheel rim, with the suction cups located intermediate the upper cover and the turning wheel.

3. The rotating device as claimed in claim 2, with the upper cover having a cover hole, with the threaded sleeve inserted through the center hole.

4. The rotating device as claimed in claim 3, further comprising an umbrella having a center post inserted through the threaded sleeve.

5. The rotating device as claimed in claim 4, further comprising a plurality of bottom protruded bars disposed on the bottom of the turning wheel.

6. The, rotating device as claimed in claim 5, with the wheel rim being annular, with the spokes being circumferential spaced from each other, with the running wheel being open between the top and the bottom intermediate the spokes, the hub, and the wheel rim, with the plurality of bottom protruded bars being disposed on the bottom of the wheel rim.

7. The rotating device as claimed in claim 1, further comprising a plurality bars disposed on the bottom of the turning wheel.

8. The rotating device as claimed in claim 7, with the wheel rim being annular, with the spokes being circumferentially spaced from each other, with the turning wheel being open between the top and the bottom intermediate the spokes, the hub, and the wheel rim, with the plurality of bottom protruded bars being disposed on the bottom of the wheel rim.

9. The rotating device as claimed in claim 8, further comprising an umbrella having a center post inserted through the threaded sleeve.

10. The rotating device as claimed in claim 1, further comprising an umbrella having a center post inserted through the threaded sleeve.

\* \* \* \* \*